US010495169B2

(12) United States Patent
Antanaitis et al.

(10) Patent No.: US 10,495,169 B2
(45) Date of Patent: Dec. 3, 2019

(54) BRAKE ROTOR PROGNOSIS

(71) Applicant: GM Global Technology Operations LLC, Detroit, MI (US)

(72) Inventors: David B. Antanaitis, Northville, MI (US); Mark T. Riefe, Brighton, MI (US); Matthew A. Robere, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 205 days.

(21) Appl. No.: 15/651,475

(22) Filed: Jul. 17, 2017

(65) Prior Publication Data

US 2019/0017561 A1    Jan. 17, 2019

(51) Int. Cl.
*F16D 66/02* (2006.01)
*B60T 17/22* (2006.01)
*F16D 66/00* (2006.01)

(52) U.S. Cl.
CPC .......... *F16D 66/021* (2013.01); *B60T 17/221* (2013.01); *F16D 66/02* (2013.01); *B60T 2250/02* (2013.01); *B60T 2250/04* (2013.01); *F16D 2066/001* (2013.01); *F16D 2066/003* (2013.01); *F16D 2066/005* (2013.01); *F16D 2066/006* (2013.01)

(58) Field of Classification Search
USPC .................................................. 701/34, 34.4
See application file for complete search history.

(56) References Cited

U.S. PATENT DOCUMENTS

| | | | | |
|---|---|---|---|---|
| 6,696,937 | B1* | 2/2004 | Kiefer | B60T 8/885 188/1.11 L |
| 6,793,057 | B1* | 9/2004 | Smith, Jr. | F16D 13/70 192/107 M |
| 2004/0069573 | A1* | 4/2004 | Anderson | F16D 66/027 188/1.11 L |
| 2008/0236269 | A1* | 10/2008 | Howell | B60T 17/221 73/121 |
| 2010/0286881 | A1* | 11/2010 | Cahill | B60T 8/00 701/70 |
| 2016/0138665 | A1* | 5/2016 | Antanaitis | F16D 66/026 701/70 |
| 2016/0163130 | A1* | 6/2016 | Zagajac | G07C 5/0808 701/29.1 |
| 2019/0017561 | A1* | 1/2019 | Antanaitis | B60T 17/221 |
| 2019/0071062 | A1* | 3/2019 | Robere | B60L 7/10 |

* cited by examiner

*Primary Examiner* — Tyler D Paige
(74) *Attorney, Agent, or Firm* — Cantor Colburn LLP (57) ABSTRACT

Technical solutions are described to for determining thickness of a vehicle brake rotor. An example method includes providing vehicle parameters that identify operating conditions of a vehicle, and using the vehicle parameters to determine work done by a brake of the vehicle as brakework. Further, the method includes using the brake work to determine brake rotor temperature, and using the brake rotor temperature to determine brake rotor wear. The method further includes accumulating the brake rotor wear to provide an estimation of the thickness of the vehicle brake rotor.

20 Claims, 5 Drawing Sheets

BRAKE ROTOR PROGNOSIS

INTRODUCTION

The present application relates generally to a system and method for estimating the thickness of a vehicle brake rotor as it wears from use and, more particularly, to using sensor fusion, oxidation wear modeling, and brake modeling for estimating the thickness of a vehicle brake rotor as it wears from use.

The brake rotor is an integral component of braking systems across multiple types of motor vehicles. The disc brake is an energy conversion device which converts mechanical energy to heat. Disc braking systems consist of a non-rotating friction material and application sub-systems, as well as a brake rotor that rotates with the wheel. To stop or slow the vehicle the friction material sub-system is engaged with the braking surfaces (rotor cheeks) of the brake rotor to generate heat due to friction, thereby converting mechanical energy to heat, and thereby slowing the rotation of the wheel.

The performance of the braking system, in general, and the brake rotor in particular, is determined to a large extent by the condition of the surface finish of the rotor cheeks. The normal course of operation of a brake system involves production of high levels of friction, which, in turn, generates high temperatures on the rotor cheek surfaces. Environmental effects caused by exposure to corrosive agents, such as road salt and water, exacerbate corrosion of the rotor. These effects, either singly or in combination, can result in pedal pulsation or a corroded braking surface.

The braking system is an aggressive environment for corrosion and high temperature oxidation of the brake rotors, which are typically made of cast iron. The oxides produced can preferentially spall during normal brake applications. Oxide spalling produces local high spots, which form deep grooves or scoring of the rotor cheek surfaces. These surface features can produce pedal pulsation during braking.

Further, in some vehicles use of open style wheel designs leave the rotor braking surfaces visible to onlookers. Surface corrosion that would normally be inconsequential with respect to the operation of the braking system becomes an issue due to the perception of this oxidation.

Corrosion causes the thickness of the rotor to reduce over time, and below certain thickness levels, the rotor operation may be sub-optimal, for example the vehicle may not stop as urgently. Accordingly, it is desirable to determine and indicate a status of the brake rotor, so that the brake system can be serviced and the rotors replaced in a timely manner.

SUMMARY

In one exemplary embodiment a method for determining thickness of a vehicle brake rotor is described. The method includes providing vehicle parameters that identify operating conditions of a vehicle, and using the vehicle parameters to determine work done by a brake of the vehicle as brake-work. The method further includes using the brake work to determine brake rotor temperature, and using the brake rotor temperature to determine brake rotor wear. Further, the method includes accumulating the brake rotor wear to provide an estimation of the thickness of the vehicle brake rotor.

In one or more examples, the brake rotor wear is an energy-based brake rotor wear, and the method further includes computing an oxidative brake rotor wear based on a time of exposure of the vehicle brake rotor. Further, the method includes computing the brake rotor wear by summing the oxidative brake rotor wear and the energy-based brake rotor wear.

In one or more examples, the oxidative brake rotor wear is computed by scaling the time of exposure of the vehicle brake rotor by a predetermined oxidative wear parameter. In one or more examples, the predetermined oxidative wear parameter is specific to a material of the vehicle brake rotor.

In one or more examples, providing vehicle parameters includes providing brake rotor friction material, brake rotor cooling rate, vehicle mass, road grade, dynamic brake proportioning, vehicle weight distribution, vehicle speed, wheel speed and brake pressure.

In one or more examples, determining the brake work includes subtracting resistance values from total work done by the brake of the vehicle where the resistance values are forces that reduce the total work.

In one or more examples, determining the brake work includes determining braking force as brake pressure times brake rotor area times brake rotor coefficient of friction.

In one or more examples, determining the brake work includes determining braking power as torque produced by the vehicle times velocity of the vehicle divided by rolling radius of a vehicle wheel.

In one or more examples, the method further includes notifying the brake rotor thickness estimation using telematics.

One or more embodiments of a vehicle brake system for determining brake rotor thickness of a brake rotor are described. For example, the system includes the brake rotor, and a processor. In one or more examples, the processor receives vehicle parameters that identify operating conditions of a vehicle, and determines work done by the brake system of the vehicle as brake work by using the vehicle parameters. The processor further determines brake rotor temperature using the brake work, and determines brake rotor wear using the brake rotor temperature. The processor further accumulates the brake rotor wear to provide an estimation of the brake rotor thickness.

In one or more examples, the brake rotor wear is an energy-based brake rotor wear. The processor further computes an oxidative brake rotor wear based on a time of exposure of the brake rotor, and computes the brake rotor wear by summing the oxidative brake rotor wear and the energy-based brake rotor wear.

In one or more examples, the oxidative brake rotor wear is computed by scaling the time of exposure of the brake rotor by a predetermined oxidative wear parameter. In one or more examples, the predetermined oxidative wear parameter is specific to a material of the brake rotor.

In one or more examples, the vehicle parameters comprise brake rotor friction material, brake rotor cooling rate, vehicle mass, road grade, dynamic brake proportioning, vehicle weight distribution, vehicle speed, wheel speed and brake pressure.

In one or more examples, the processor further notifies of the brake rotor thickness estimation using telematics.

One or more embodiments describe a computer program product comprising non-transitory computer readable medium having computer executable instructions, the computer executable instructions causing a processing unit to determine thickness of a vehicle brake rotor. In one or more examples, the instructions cause the processing unit to determine thickness of the vehicle brake rotor by computing work done by a brake of a vehicle based on vehicle parameters that identify operating conditions of a vehicle, determining brake rotor temperature based on the work done by the brake, determining brake rotor wear based on the brake rotor temperature, and further accumulating the brake rotor wear to provide an estimation of the thickness of the vehicle brake rotor.

In one or more examples, the brake rotor wear is an energy-based brake rotor wear. The determining the thickness of the vehicle rotor brake further includes determining an oxidative brake rotor wear based on a time of exposure of the vehicle brake rotor, and computing the brake rotor wear by summing the oxidative brake rotor wear and the energy-based brake rotor wear.

In one or more examples, the oxidative brake rotor wear is computed by scaling the time of exposure of the vehicle brake rotor by a predetermined oxidative wear parameter, the predetermined oxidative wear parameter being specific to a material of the vehicle brake rotor.

In one or more examples, the vehicle parameters include brake rotor friction material, brake rotor cooling rate, vehicle mass, road grade, dynamic brake proportioning, vehicle weight distribution, vehicle speed, wheel speed and brake pressure.

In one or more examples, the computer executable instructions further cause the processing unit to notify of the thickness of the vehicle brake rotor via telematics of the vehicle.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
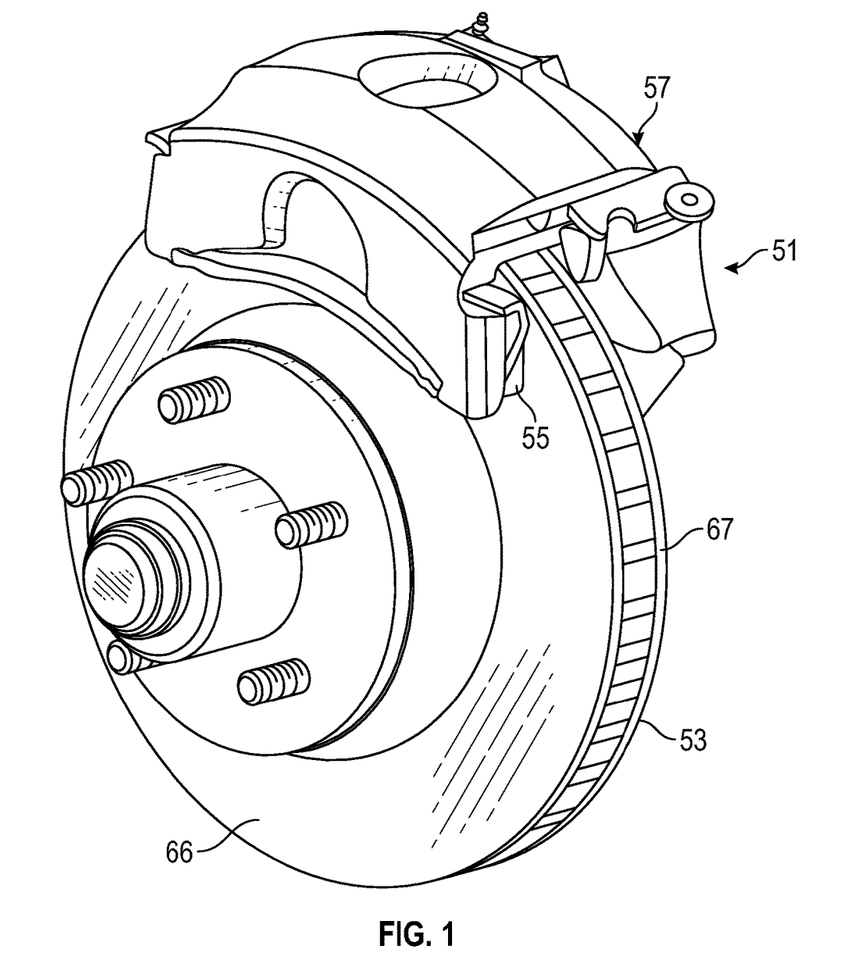
FIG. 1 depicts example components of a disc brake system of a vehicle according to one or more embodiments.

FIG. 1 depicts example components of a disc brake system 51 of a vehicle according to one or more embodiments. It should be noted that in other examples, the disc brake system 51 may include additional, fewer, and/or different components than those illustrated here. The disc brake system 51 includes a rotor 53 and pads 55. In one or more examples, the rotor 53 is also referred to as a disc. The brake system 51 further includes a brake caliper assembly 57. In one or more examples, the rotor 53 has pad-contacting surfaces (cheeks) 66, 67. The brake caliper 57 is typically fixed to the vehicle and fits around a sector of the rotor 53. When a vehicle operator engages a brake pedal of the vehicle, hydraulic fluid is pressurized in a brake hose connected to the brake caliper 57 and forces the friction material of the pads 55 against both surfaces 66, 67 of the rotor 53, which is rotating with a wheel of the vehicle. The frictional engagement between the pads 55 and the rotating rotor 53 serves to slow, and possibly stop, the vehicle wheel.

It should be noted that while solid rotors may be used, medium to large rotors used on heavier or higher performance vehicles might employ vented rotors. Vented rotors incorporate radial cooling passages located between the brake pad-contacting rotor surfaces 66, 67, which, under rotor rotation, function as air pumps to circulate air from the rotor center to the outside of the rotor. The location of the cooling outlets of the rotor may vary depending on the type of rotor.

The technical solutions described herein facilitate using sensor information, driver braking information and driver brake models to predict or estimate brake rotor thickness, and provide an indication of remaining brake rotor life, such as in remaining miles or percentage of brake rotor thickness, to the vehicle operator. As will be discussed in detail below, the brake rotor thickness estimation algorithm uses various parameters and sensor signals to provide the estimation, including, but not limited to, brake rotor material properties, brake rotor cooling rate, brake temperature, vehicle mass, road grade, dynamic brake proportioning, vehicle weight distribution, brake pressure applied, braking energy, braking power, etc.

Figure 2:
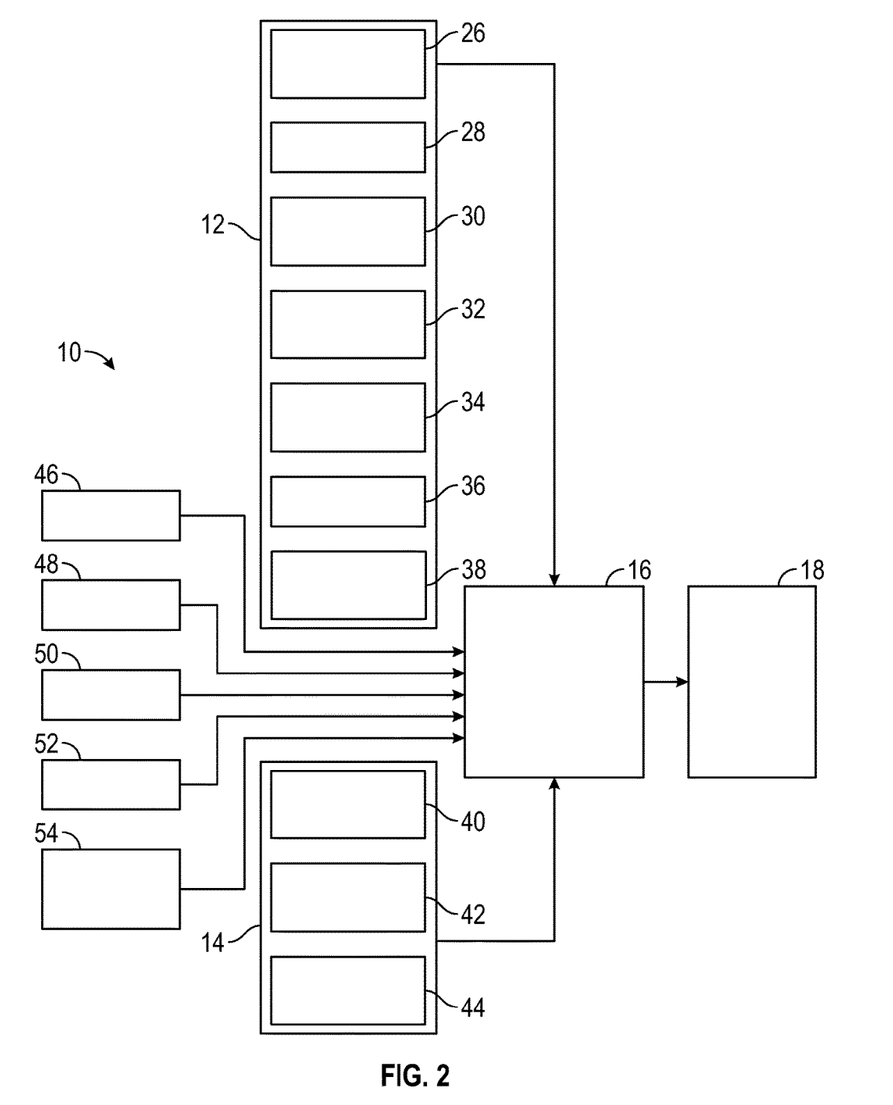
FIG. 2 is a block diagram of a brake rotor thickness estimation system, according to one or more embodiments.

FIG. 2 is a block diagram of a brake rotor thickness estimation system 10, according to one or more embodiments. The system 10 includes a brake controller 12 and a powertrain controller 14. Further, the system 10 includes a model and data fusion processor 16 and a brake rotor wear estimation processor 18.

The brake controller 12 includes a brake rotor temperature estimation processor 26, wheel speed sensors 28, a brake pressure processor 30 and a brake power calculation processor 32. Additionally, the brake controller 12 includes a processor 34 providing brake system dynamics, a processor 36 providing brake cooling rate and a processor 38 that provides signals from an anti-lock brake system (ABS), traction control system (TCS), electronic control system (ECS) and an active cornering control (ACC). All or most of the calculations done in the processors 26-38 are currently available on vehicles and/or are well known to those skilled in the art.

The power train controller 14 includes a vehicle mass estimation processor 40, a road grade estimation processor 42 and a road roughness estimation processor 44. Additional signals may be available for estimating the brake rotor thickness, such as vehicle odometer 46, global positioning system (GPS) signals 48, map information 50, vehicle telematics 52 and an ambient temperature sensor 54. All of the signals provided by these processors and devices are also typically available on a vehicle, and would be readily available to those skilled in the art.

The brake rotor temperature estimation processor 26 estimates the temperature of the brake rotor 53. Depending on the brake rotor material, the brake rotor wear will depend on the temperature of the brake rotor 53. The cooling rate of the brake rotor helps determine the brake rotor temperature, and is dependent on the vehicle design, vehicle speed, wheel speed, ambient temperature, altitude, etc. As the vehicle is operated, the air flowing around the brake rotor 53 will determine how fast the rotor 53 is cooled from the previous braking event. in one or more examples, the brake rotor temperature is measured with sensors. However, such sensors are expensive, and thus, an algorithm estimating the brake rotor temperature is used in one or more examples.

The braking power processor 30 estimates the braking energy dissipation in the brake system 51. This calculation uses various inputs, such as stopping distance, stopping time, brake rotor temperature, etc. The brake pressure processor 30 can use the master cylinder pressure of the braking system 51, the weight distribution in the vehicle and the dynamic brake proportioning for the proportional brake pressure at each wheel to determine the brake pressure. The dynamic brake proportioning is based on where the weight in the vehicle is distributed, and is a known calculation.

The vehicle mass estimation processor 40 estimates the vehicle mass, typically based on engine torque, and is a process well known to those skilled in the art. The mass of the vehicle may change as a result of the number of passengers, load in the trunk, fuel capacity, etc. Further, it is known in the art to estimate the road grade in the estimation processor 42 in combination with the estimation of the vehicle mass.

The processor 16 can calculate the braking energy using equation (1) below. The braking energy is the work done by the brakes to decelerate the vehicle, and is the total work minus the rolling resistance, the aerodynamic drag, the engine braking and the road grade. The brake work can be used to calculate the power dissipated by the brakes, where power equals work/time. The power can be calculated at predetermined time intervals, for example, every 10 ms, during the braking event.

$$BrakingEnergy = \frac{1}{2}M(V_I^2 - V_F^2) - E_{RR} - E_G - E_E \quad \text{Equation (1)}$$

In equation (1), M is the mass of the vehicle, $E_{RR}$ (RR=Rolling Resistance) is the energy required to roll the vehicle on a flat grade, which is a known value and can be represented as a function of vehicle speed, for example $E_{RR}=aV^2+bV+C$, where "V" is vehicle velocity and "a", "b", "c" are predetermined coefficients. Further, in equation (1), $E_G$ (G=Grade) is the energy required to roll the vehicle as a result of the grade of the road, which is also a known value, $E_E$ (E=Engine) is the braking provided by the engine itself, and is also a known value, $V_I$ is the velocity of the vehicle at the beginning of the braking event and $V_F$ is the velocity of the vehicle at the end of the braking event. In an alternate embodiment, vehicle deceleration can be used instead of the vehicle speed V, and can be provided by a longitudinal acceleration sensor.

The braking power dissipated by the braking event can also be estimated as power=force X velocity. Braking force can be calculated by the processor 16 as:

$$BrakingForce = Pressure \cdot Area \cdot \mu \quad \text{Equation (2)}$$

In Equation (2) $\mu$ is the friction coefficient of the brake rotor 53, which is a function of the rotor temperature, and area is the surface area of the brake rotor 53.

Alternately, the braking power can be calculated by the processor 16 as:

$$BrakingForce = \frac{Torque}{RollingRadius} \cdot Velocity \quad \text{Equation (3)}$$

In Equation (3), The torque is calculated for both the front and the rear of the vehicle and is a function of the brake pressure and the dynamic brake proportioning. The RollingRadius is the rolling radius of the wheel and velocity is the vehicle velocity.

In one or more examples, the integration of the applied braking force is input into a physical thermal model for first order dynamics to determine an estimate of the brake temperature. Brake rotor dynamometer tests can be used to obtain the brake pad friction coefficient as a function of temperature. The tests are used to determine the amount of wear expected at different rotor temperatures, and the thermal model is configured accordingly.

Further, the force required to stop the vehicle can be estimated by the processor 16 as:

$$Force = Mass \cdot Acceleration \quad \text{Equation (4)}$$

The front/rear brake proportioning information and the cornering information available from the brake controller 12 is used to determine the power distribution on each axis and corner. The vehicle mass estimation is available from the powertrain controller 14, and is also used in these equations. From the braking energy or the braking power, the brake rotor temperature can be determined as a proportional value, and from the brake rotor temperature, the brake rotor wear can be determined as a proportional value. For example, one or more look-up tables in the estimation processor 18 facilitate determining the proportional values. The look-up table(s) are populated based on the relationship between the braking energy and the brake rotor temperature and the brake rotor temperature and the brake rotor wear based on the calculations discussed above and the properties of the brake rotor. Each time the system 10 calculates the wear of the brake rotor, it is added to the previous calculations of wear over time, and can then be extrapolated from the vehicle mileage to determine the remaining mileage for each brake rotor. Alternatively, or in addition, instead of using look-up tables, in one or more examples, the estimation processor 18 determines the rotor wear dynamically using a predetermined computation formula that is based on the relationship between the braking energy and the brake rotor temperature and the brake rotor temperature and the brake rotor wear.

The processor 16 uses a combination of the above available information to estimate oxidation of the rotor 53. For example, the processor 16 uses an oxidative wear model for the material of the rotor 53 to determine how much the rotor 53 has worn based on the combination of the above available information. For example, the oxidative wear model uses a time of exposure of the rotor 53 and an oxidative wear parameter that is a predetermined configurable value.

In one or more examples, the oxidative wear parameter is based on a type of the rotor 53, for example, material, shape, dimensions, and other parameters of the rotor 53. The oxidative wear parameter represents a rate of penetration of oxides into the rotor material. In one or more examples, the time of exposure of the rotor 53 is monitored from the time since manufacture of the vehicle and/or since the rotor 53 is serviced. For example, the processor measures a time associated with each braking event, for example amount of time the vehicle operator holds the brake pedal down to cause the vehicle to slow down. The measured time is accumulated to provide the time of exposure of the rotor 53. Alternatively, or in addition, the time of exposure is time measured since the rotor 53 is installed on the vehicle. The time of exposure is reset when the rotor 53 is replaced. In one or more examples, a vehicle subsystem, such as a vehicle computer keeps track of the time since the rotor in installed on the vehicle and provides access to the value when requested.

Scaling the time of exposure with the oxidative wear parameter provides an amount (for example, in millimeters or micrometers) of corrosion of the rotor 53. Alternatively, in one or more examples, the processor 16 uses a look-up table to determine the amount of corrosion of the rotor based on the time of exposure, the look-up table including corrosion values based on the oxidative wear parameter. The oxidative wear parameter is the rate of corrosion for the rotor. In one or more examples, the oxidative wear parameter is adjusted according to a vehicle location, for example which are available from a global positioning system (GPS) of the vehicle 10. For example, the processor 16 uses a look-up table to determine the oxidative wear parameter to use based on location coordinates received from the GPS. The location coordinates may be used to identify a geographic region, such as a city, a state, or the like, and an oxidative wear parameter corresponding to the geographic region is then used for determining the corrosion of the rotor 53.

Figure 3:
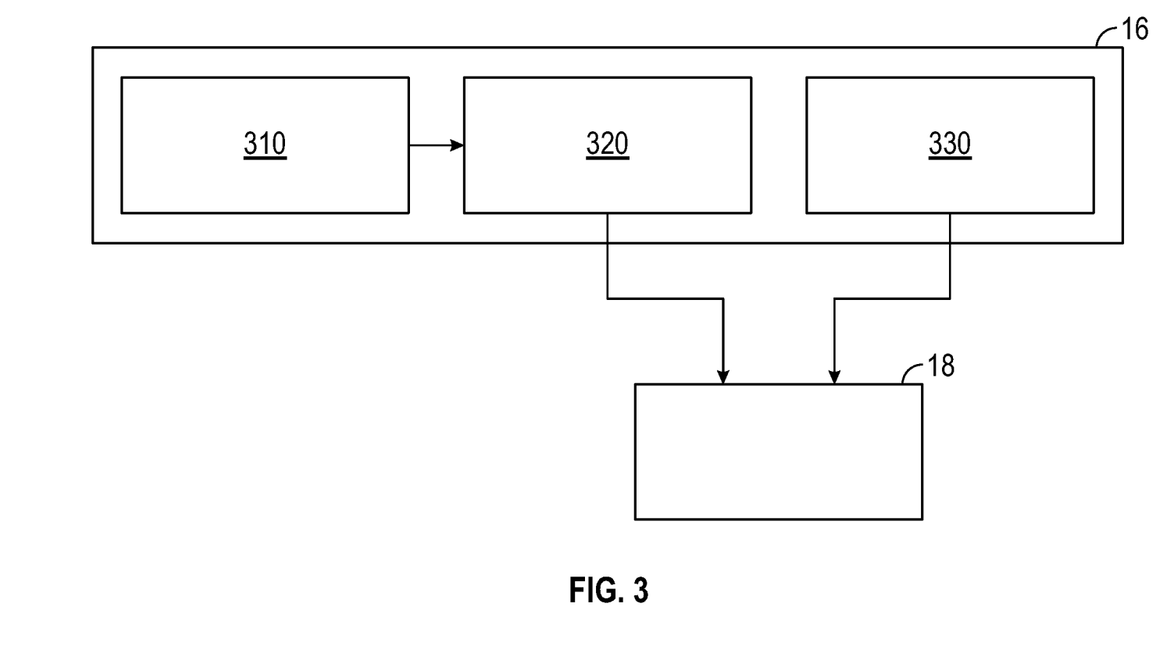
FIG. 3 depicts an example block diagram of a model and data fusion processor according to one or more embodiments.

FIG. 3 depicts an example block diagram of the model and data fusion processor 16 according to one or more embodiments. The rotor wear estimation processor 18 uses a combination of the above available information to estimate the thickness of the brake rotor 53. The processor 16 uses a rotor temperature model 310 to determine a temperature of the rotor 53. The processor 16 further uses a rotor energy to determine braking energy that is absorbed by the rotor 53. Based on the rotor temperature and the rotor braking energy absorbed, the processor 16 determines a corrosion or wear of the rotor 53 according to an energy-based wear model 320. The processor 16 uses a wear volume per unit of energy absorbed by the rotor to determine how much the rotor 53 wears based on the model 320. For example, the processor 16 determines an energy-based wear of the rotor 53 according to a volume of wear per energy units absorbed at the determined temperature. For example, the processor 16 computes the energy units absorbed by the rotor 53 at a braking event at the determined temperature using the equations described herein. Further, a volume of wear of the rotor 53 is computed by multiplying the computed energy-based wear by a surface area of the rotor 53.

Further, the processor 16 uses a rotor oxidative wear model 330 to compute an oxidative wear of the rotor 53. For example, the processor 16 computes the oxidative wear of the rotor 53 based on the oxidative wear parameter and the time of exposure of the rotor 53.

The processor 16 computes the energy based wear and the oxidative wear periodically at a predetermined frequency, such as 10 ms, 20 ms, or any other predetermined frequency. Alternatively, or in addition, the processor 16 computes the wear every time a braking event occurs.

The processor 16 forwards the computed wear to the rotor thickness estimation processor 18. The rotor thickness estimation processor 18 accrues the wear of rotor 53 over time as the vehicle is being operated. The rotor thickness estimation processor 18 uses the accrued wear to determine an estimated thickness of the rotor 53. The rotor thickness estimation processor 18 further uses the thickness of the rotor 53 to estimate life of the rotor 53, for example in terms of time, miles, or any other parameter, for example, using a corrosion model specific to the rotor 53.

The proportioning of the information can be calibrated for different applications and different vehicles. An estimate of the amount of material of the brake wear lost together with the mileage that the vehicle has been driven since the rotors were last changed are recorded on the vehicle. The current estimation can be stored in separate modules on the vehicle. This is used to store the information should a fault occur on one of the modules causing it to be replaced. An estimate of the remaining vehicle mileage can be obtained in a number of ways, such as from driver braking characteristics, linear interpolation or look-up tables of the mileage and the brake rotor thickness estimation.

If the system 10 includes a brake rotor sensor that provides signals indicative of actual brake rotor thickness, the signals are used to gradually ramp out any differences between the estimation of the brake rotor thickness and the actual thickness over the remaining rotor thickness and life of the rotor 53. For example, the sensor may be set so that one or more wires break at a specific rotor thickness. If a significant difference exists between the estimate and the actual thickness, as determined when the sensor wires break contact, then this will be used to gradually adjust the estimate so that when the rotor 53 is near the replacement period, or the next sensor measurement, the total system accuracy will be as high as possible. For example, the estimate of the rotor life remaining is increased or decreased at a rate different from that observed so that the end of the life of the rotor 53 will be accurately determined.

It should be noted that although the brake sensor discussed above employs wires that break to give an indication of rotor thickness, other types of brake sensors can be used in other examples of the system 10. For example, an indirect sensor or sensing mechanism can be used to infer the brake rotor thickness. Suitable examples include brake fluid level sensors or measuring the displacement of the brake calipers, such as in an electro-mechanical or brake-by-wire system.

Figure 4:
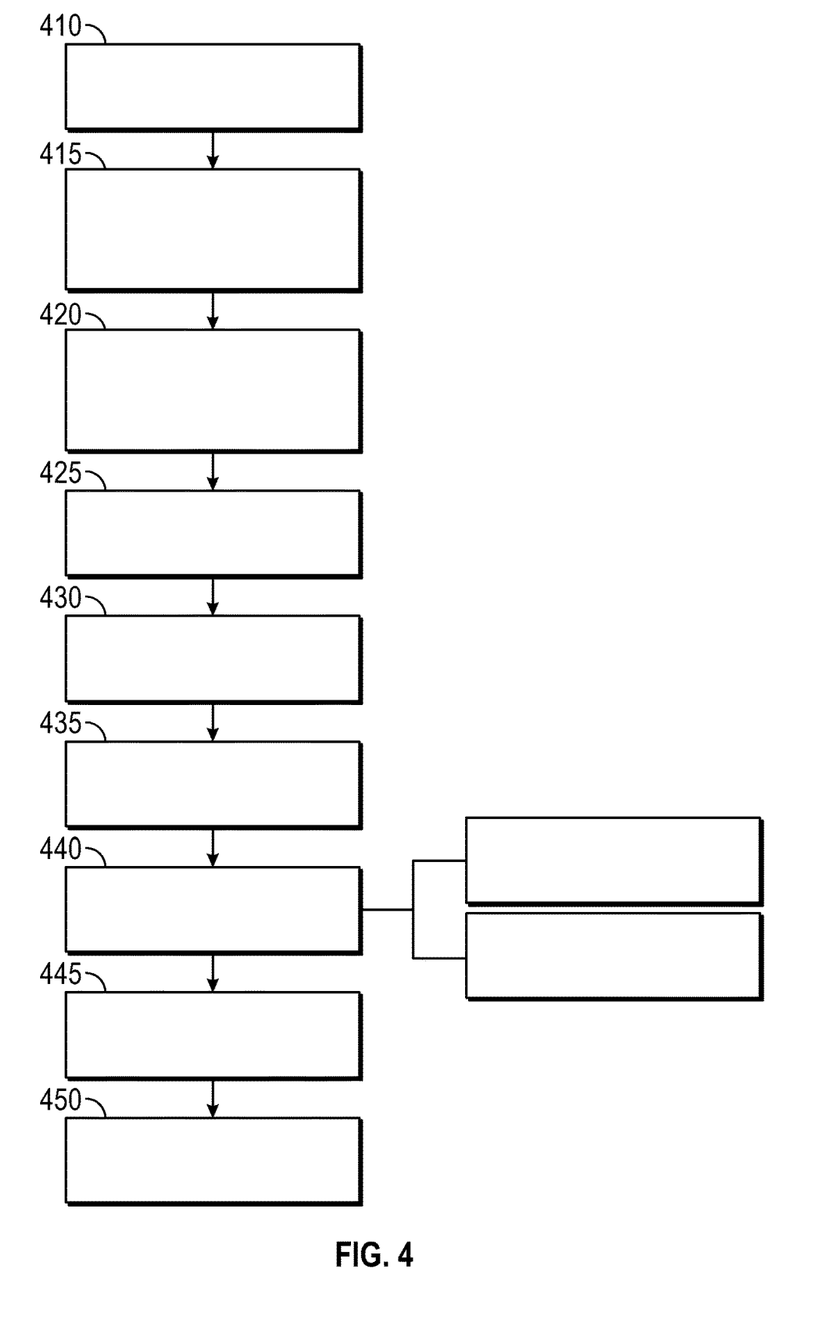
FIG. 4 depicts a flowchart of an example method for estimating brake rotor thickness, according to one or more embodiments.

FIG. 4 depicts a flowchart of an example method for estimating brake rotor thickness, according to one or more embodiments. The method includes receiving and collecting various vehicle signals, such as brake pressure, wheel speeds, vehicle speed, longitudinal acceleration, dynamic brake proportioning, brake being applied, etc., as shown at 410. The method further includes obtaining system estimates from the power train controller 14, such as the vehicle mass, road grade, amount of engine braking, rolling resistance, rotor surface area etc, as shown at 415. The method further includes obtaining system estimates from the brake controller 12, such as the brake temperature, as shown at 420. The method further includes computing the brake work from braking energy, as shown at 425. For example, the braking energy is computed as per the equation (1). The braking energy can be calculated for any one of the several brake rotors on the vehicle or can be one calculation per vehicle axle.

Additionally, or alternately, the method includes determining the brake work using braking power from, for example, equations (2) and (3), as shown at 430. In this calculation, the brake work is determined by braking power and pressure, such as provided by equation (2). Errors can sometimes occur when determining the mass of the vehicle for the braking energy calculation and the friction coefficient value $\mu$ can include errors in the brake power estimation. Therefore, a more accurate determination of the brake work may be provided by combining the two work calculations.

The method further includes determining the brake rotor temperature, as shown at 435, and determining the brake rotor wear, as shown at 440 in the manner discussed above. Determining the brake rotor wear, at 440, includes computing the energy-based wear and the oxidation wear, and the total rotor wear is a sum of the two wear computations. The brake rotor wear is determined for each braking event, and is added to the accumulated value, as shown at 445 to determine the remaining brake rotor thickness. The method includes sending the estimated thickness information to the vehicle operator using, for example, vehicle telematics, as shown at 450.

Figure 5:
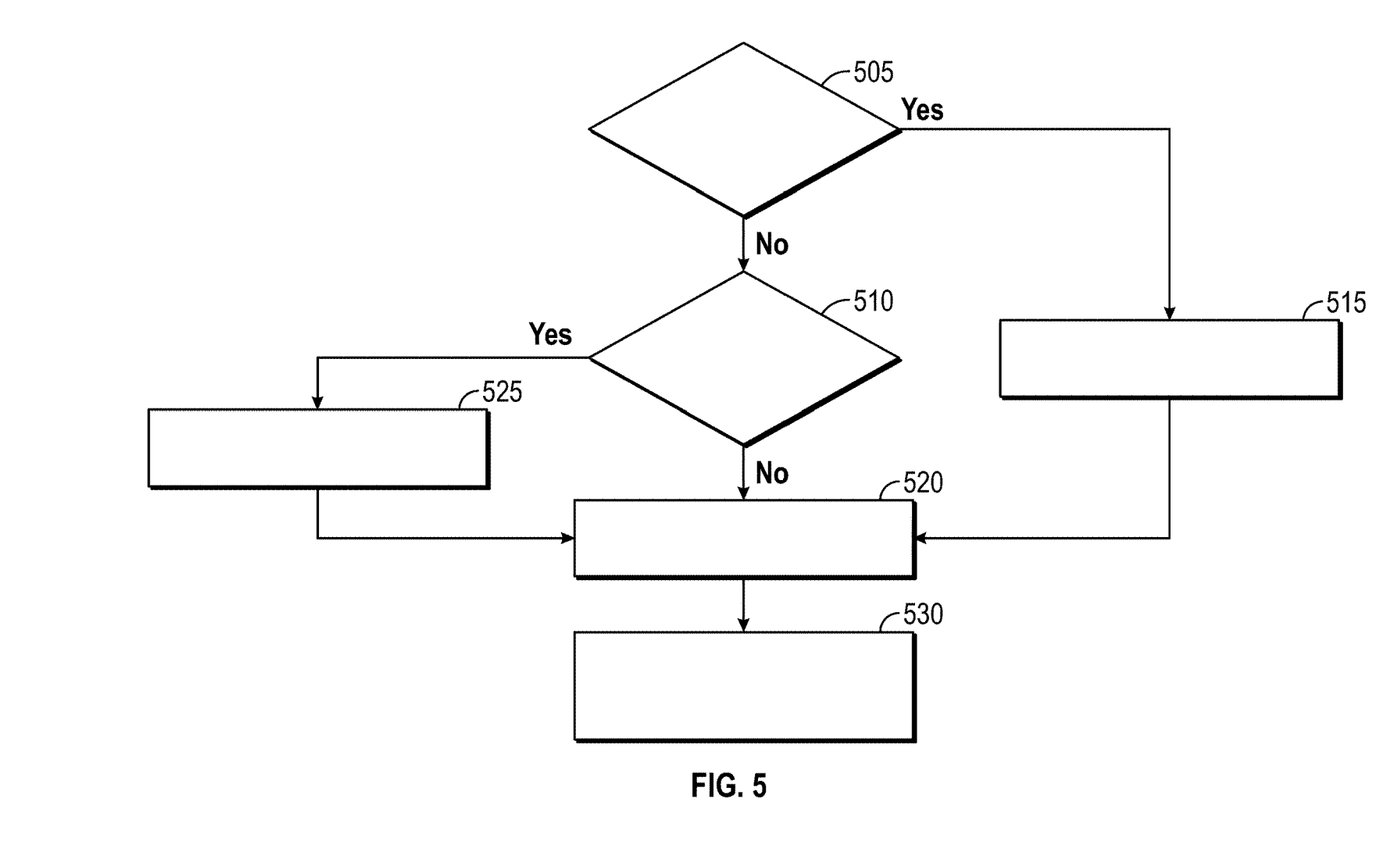
FIG. 5 depicts a flowchart of an example method for notifying the vehicle operator of the estimated brake rotor thickness according to one or more embodiments.

FIG. 5 depicts a flowchart of an example method for notifying the vehicle operator of the estimated brake rotor thickness according to one or more embodiments. The method includes determining whether the wear level of the brake rotor 53 is greater than a first predetermined threshold, as shown at 505. The rotor thickness is determined based on the process discussed herein. The first predetermined threshold is a predetermined value at which replacing the rotor 53 is recommended. For example, the replacement threshold may be a proportional value, such as 50% of original thickness of the rotor, or an absolute value, such as 2 mm. It should be noted that the above values are examples, and that different embodiments may use different threshold values than those above.

If the replacement threshold is reached, the vehicle operator is notified to replace the brake rotor 53, as shown at 515. If the brake rotor thickness has not reached the replacement threshold, the method includes determining if the rotor thickness has reached a second predetermined threshold, as shown at 510. The second predetermined threshold may be a predetermined value that is representative of an inspection threshold. For example, the replacement threshold may be a proportional value, such as 75% of original thickness of the rotor, or an absolute value, such as 1.5 mm, 2 mm, or the like. It should be noted that the above values are examples, and that different embodiments may use different threshold values than those above. If the inspection threshold is reached, the vehicle operator is indicated to have the brake rotor 53 inspected, as shown at 525.

In one or more examples, regardless of the relation between the rotor thickness and the threshold values, the vehicle operator is informed of the current estimated brake rotor thickness, as shown at 530. Further, the method includes determining a life of the rotor left based on the estimated wear of the rotor 53, as shown at 520. For example, the life of the rotor may be measured in terms of an estimated number of miles that the rotor 53 can be used before the replacement threshold is reached. For example, the method includes informing the vehicle operator in miles using a linear interpolation based on vehicle operation to date as to the remaining life of the brake rotor 53, as shown at 530. The method thus facilitates the vehicle operator to be notified in any suitable manner, and can be informed of the miles remaining based on the current wear of the brake rotor 53 as to when the brake rotor need to be replaced.

In one or more examples, the vehicle is an autonomous vehicle with the vehicle operator being a processor unit. In such cases, the processor unit receives the estimated rotor thickness and/or the remaining rotor life estimate. Based on such input, the vehicle operator processor unit automatically drives the vehicle to a service station. For example, if the rotor thickness falls below the inspection threshold, the processor unit causes the vehicle to be driven to the service station for the rotor inspection. Alternatively, or in addition, if the rotor thickness falls below the replacement threshold, the processor unit causes the vehicle to be driven to the service station for the rotor replacement. Other automatic actions may also be performed in response to the rotor thickness comparison, such as scheduling servicing of the vehicle.

Alternatively, or in addition, the rotor thickness estimates are used for limiting vehicle operation if the rotor thickness falls below a predetermined value, such as the replacement threshold. For example, limiting the vehicle operation may include limiting a maximum speed of the vehicle, limiting torque produced by an engine of the vehicle, or imposing any other such limitations to maximize safety of the passenger(s) of the vehicle.

It should be noted that although the examples so far describe computing the rotor thickness and using the computed thickness to determine the life of a rotor, in one or more examples, the rotor thickness of all the rotors equipped in the vehicle are analyzed. Accordingly, the vehicle operator is informed of the rotor thickness and rotor life estimated for each rotor that is installed on the vehicle.

The technical solutions described herein facilitate predicting rotor wear for a disc brake system by combining energy and oxidative wear based models. The technical solutions predict brake disc wear over a wide range of vehicle use and generate an electronic disc wear/disc remaining life signal. The disc wear and/or life remaining may be displayed to the vehicle operator and/or used in various control algorithms that are implemented by one or more electronic control units (ECU) in the vehicle.

The technical solutions can save a vehicle owner from costly repairs resulting from excessive wear of a brake disc. The technical solutions can further help owners of fleets (such as autonomous vehicle fleets) monitor brake life (in combination with the pad wear monitoring) to plan when to service vehicles.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for determining a thickness of a vehicle brake rotor, the method executable by a processor coupled to a memory, the method comprising:
   receiving, by the processor, vehicle parameters that identify operating conditions of a vehicle;
   determining, by the processor, work done by a brake of the vehicle as brake work based on the vehicle parameters;
   determining, by the processor, brake rotor temperature based on the brake work;
   determining, by the processor, brake rotor wear based on the brake rotor temperature; and
   accumulating, by the processor, the brake rotor wear to determine and notify an estimation of the thickness of the vehicle brake rotor.

2. The method of claim 1, wherein the brake rotor wear is an energy-based brake rotor wear, and the method further comprising:
   computing an oxidative brake rotor wear based on a time of exposure of the vehicle brake rotor; and
   computing the brake rotor wear by summing the oxidative brake rotor wear and the energy-based brake rotor wear.

3. The method of claim 2, wherein the oxidative brake rotor wear is computed by scaling the time of exposure of the vehicle brake rotor by a predetermined oxidative wear parameter.

4. The method of claim 3, wherein the predetermined oxidative wear parameter is specific to a material of the vehicle brake rotor.

5. The method of claim 1, wherein providing vehicle parameters includes providing brake rotor friction material, brake rotor cooling rate, vehicle mass, road grade, dynamic brake proportioning, vehicle weight distribution, vehicle speed, wheel speed and brake pressure.

6. The method of claim 1, wherein determining the brake work includes subtracting resistance values from total work done by the brake of the vehicle where the resistance values are forces that reduce the total work.

7. The method of claim 1, wherein determining the brake work includes determining braking force as brake pressure times brake rotor area times brake rotor coefficient of friction.

8. The method of claim 1, wherein determining the brake work includes determining braking power as torque produced by the vehicle times velocity of the vehicle divided by rolling radius of a vehicle wheel.

9. The method of claim 1, further comprising notifying of the estimation of the brake rotor thickness utilizing telematics of the vehicle.

10. A vehicle brake system for determining brake rotor thickness of a brake rotor, the vehicle brake system comprising:
    the brake rotor; and
    a processor configured to:
      receive vehicle parameters that identify operating conditions of a vehicle;
      determine work done by the brake system of the vehicle as brake work based on the vehicle parameters;
      determine brake rotor temperature based on the brake work;
      determine brake rotor wear based on the brake rotor temperature; and
      accumulate the brake rotor wear to determine and notify an estimation of the brake rotor thickness.

11. The system of claim 10, wherein the brake rotor wear is an energy-based brake rotor wear, and the processor is further configured to:
    compute an oxidative brake rotor wear based on a time of exposure of the brake rotor; and
    compute the brake rotor wear by summing the oxidative brake rotor wear and the energy-based brake rotor wear.

12. The system of claim 11, wherein the oxidative brake rotor wear is computed by scaling the time of exposure of the brake rotor by a predetermined oxidative wear parameter.

13. The system of claim 12, wherein the predetermined oxidative wear parameter is specific to a material of the brake rotor.

14. The system of claim 10, wherein the vehicle parameters comprise brake rotor friction material, brake rotor cooling rate, vehicle mass, road grade, dynamic brake proportioning, vehicle weight distribution, vehicle speed, wheel speed and brake pressure.

15. The system of claim 10, the processor further configured to notify the estimation of the brake rotor thickness utilizing telematics of the vehicle.

16. A computer program product comprising a non-transitory computer readable medium having program instructions for determining a thickness of a vehicle brake rotor embodied therewith, the program instructions executable by a processor to cause the processor to perform operations comprising:
    determining work done by a brake of a vehicle based on vehicle parameters that identify operating conditions of a vehicle;
    determining brake rotor temperature based on the work done by the brake;
    determining brake rotor wear based on the brake rotor temperature; and
    accumulating the brake rotor wear to determine and notify an estimation of the thickness of the vehicle brake rotor.

17. The computer program product of claim 16, wherein the brake rotor wear is an energy-based brake rotor wear, and determining an estimation of the thickness of the vehicle rotor brake further comprises:
    determining an oxidative brake rotor wear based on a time of exposure of the vehicle brake rotor; and
    computing the brake rotor wear by summing the oxidative brake rotor wear and the energy-based brake rotor wear.

18. The computer program product of claim 17, wherein the oxidative brake rotor wear is computed by scaling the time of exposure of the vehicle brake rotor by a predetermined oxidative wear parameter, the predetermined oxidative wear parameter being specific to a material of the vehicle brake rotor.

19. The computer program product of claim 16, wherein the vehicle parameters comprise brake rotor friction material, brake rotor cooling rate, vehicle mass, road grade, dynamic brake proportioning, vehicle weight distribution, vehicle speed, wheel speed and brake pressure.

20. The computer program product of claim 16, the program instructions executable by a processor to cause the processor to perform operations comprising notifying an estimation of the thickness of the vehicle brake rotor via telematics of the vehicle.

* * * * *